US012686834B2

(12) United States Patent
Ikels et al.

(10) Patent No.: US 12,686,834 B2
(45) Date of Patent: Jul. 21, 2026

(54) PROCESS AND DEVICE FOR OBTAINING OIL FROM SEEDS

(71) Applicant: HARBURG-FREUDENBERGER MASCHINENBAU GMBH, Hamburg (DE)

(72) Inventors: Jan Ikels, Hamburg (DE); Maik Bille, Hamburg (DE)

(73) Assignee: HARBURG-FREUDENBERGER MASCHINENBAU GMBH, Hamburg (DE)

( * ) Notice: Subject to any disclaimer, the term of this patent is extended or adjusted under 35 U.S.C. 154(b) by 585 days.

(21) Appl. No.: 17/925,498

(22) PCT Filed: Apr. 27, 2021

(86) PCT No.: PCT/DE2021/100380
§ 371 (c)(1),
(2) Date: Nov. 15, 2022

(87) PCT Pub. No.: WO2021/233495
PCT Pub. Date: Nov. 25, 2021

(65) Prior Publication Data

US 2023/0183599 A1 Jun. 15, 2023

(30) Foreign Application Priority Data

May 20, 2020 (DE) ..................... 10 2020 113 622.6

(51) Int. Cl.
*B30B 9/12* (2006.01)
*C11B 1/04* (2006.01)
(Continued)

(52) U.S. Cl.
CPC ................ *C11B 1/06* (2013.01); *B30B 9/125* (2013.01); *C11B 1/04* (2013.01); *C11B 1/104* (2013.01)

(58) Field of Classification Search
CPC B30B 9/125; B30B 13/00; C11B 1/06; C11B 1/04; C11B 1/104; C11B 1/08
See application file for complete search history.

(56) References Cited

U.S. PATENT DOCUMENTS

| | | | |
|---|---|---|---|
| 2006/0283799 | A1 | 12/2006 | Homann |
| 2008/0260902 | A1 | 10/2008 | Van Houten |

(Continued)

FOREIGN PATENT DOCUMENTS

| | | | |
|---|---|---|---|
| DE | 102005027722 | A1 | 12/2006 |
| DE | 102007014775 | A1 | 10/2008 |

(Continued)

OTHER PUBLICATIONS

International Search Report Dated Aug. 16, 2021, PCT/DE2021/100380, 3 Pages.

*Primary Examiner* — Jimmy T Nguyen
(74) *Attorney, Agent, or Firm* — LUCAS & MERCANTI, LLP; Klaus P. Stoffel

(57) ABSTRACT

A process and a device for obtaining oil from seeds, wherein at least one of the parameters of moisture, fiber content and oil content of the pressed material is continuously measured and evaluated, thus making it possible to continuously control at least one of the following variables: moisture of the pressed material, speed of the press drive and amount of an extraction agent supplied. The oil yield can be increased, the fluctuations in the oil yield can be reduced and energy can be saved by implementing the device-related and process-related features according to the invention.

5 Claims, 2 Drawing Sheets

(51) Int. Cl.
*C11B 1/06* (2006.01)
*C11B 1/10* (2006.01)

(56) References Cited

U.S. PATENT DOCUMENTS

| | | | |
|---|---|---|---|
| 2014/0083939 | A1 | 3/2014 | Nguyen |
| 2020/0054962 | A1 | 2/2020 | Vanaman |

FOREIGN PATENT DOCUMENTS

| | | | | | |
|---|---|---|---|---|---|
| DE | 102008007874 | A1 | * | 10/2009 | ................ C10J 3/00 |
| DE | 102018002829 | A1 | | 10/2018 | |
| EP | 1717014 | B1 | | 5/2017 | |
| JP | H11326195 | A | | 11/1999 | |
| WO | WO-2008138324 | A1 | * | 11/2008 | ........... A23L 1/0252 |
| WO | 2014059273 | A1 | | 4/2014 | |

* cited by examiner

PROCESS AND DEVICE FOR OBTAINING OIL FROM SEEDS

CROSS-REFERENCE TO RELATED APPLICATIONS

The present application is a 371 of International application PCT/DE2021/100380, filed Apr. 27, 2021, which claims priority of DE 10 2020 113 622.6, filed May 20, 2020, the priority of these applications is hereby claimed and these applications are incorporated herein by reference.

BACKGROUND OF THE INVENTION

The invention relates to a process for obtaining oil from oil-containing seeds by pressing, wherein optionally in addition to the mechanical pressing of the oil, the yield of the extraction process is improved by the addition of carbon dioxide as an extracting agent.

In addition, the invention relates to a device for obtaining oil from oil-containing seeds in the meaning of an oil press, wherein optionally in addition to the mechanical pressing of the oil, the yield of the extraction process is improved by the addition of carbon dioxide as an extracting agent.

Such processes and devices are used to press oil out of oil-containing seeds. For this purpose, the pressed material is supplied to a pressing device, for example, designed as a screw press, in which oil is withdrawn from the pressed material by mechanical pressing, so that solid and liquid components of the pressed material are separated from one another.

To assist the pressing procedure and to increase the oil yield, admixing an extracting agent with the pressed material is already known, wherein a significant reduction of the viscosity (flowability) can be achieved by dissolving the extracting agent in the extract (oil), so that the extract can drain off more easily.

Carbon dioxide is usable as such an extracting agent, for example, which is admixed with the pressed material in the form of supercritical carbon dioxide and wherein the oily extract is then dissolved in the supercritical carbon dioxide at very high pressures. The supercritical state physically describes in this case a physical state in the transition from the gaseous to the liquid phase of the carbon dioxide. The extract dissolved in the supercritical carbon dioxide is obtained in pure form after its discharge from the press by evaporation of the carbon dioxide. The evaporated carbon dioxide is either released into the atmosphere or compressed again and reused.

Providing and handling the supercritical carbon dioxide and the required apparatus design for handling this extracting agent in relatively small quantities are taught, for example, in EP 1717014 B1.

Processes and devices of the above-mentioned type are proposed in DE 10 2007 014 775 A1, which enable an improvement of the product quality of the obtained oil in particular for the use for food oil production, which is achieved in particular by limiting the temperature of the extract to at most 60° C. during the entire extraction process.

The oil yield of the entire extraction process, independently of the addition of an extracting agent, is also significantly dependent on the moisture and the fiber content of the supplied pressed material.

To optimize the oil yield, it is necessary to ascertain the moisture and the fiber content of the pressed material and to adapt the extraction process accordingly.

The prior art in this case is that samples are taken from the pressed material at a defined time interval and are then analyzed in a stationary laboratory device with respect to the moisture and the fiber content. Based on the results of the analysis, corresponding control values, for example, a new control value for the regulating valve, are then manually specified in the process control system.

According to the prior art, using the above-mentioned processes and devices, oil yields between approximately 52% and 55% in the initial pressing and of approximately 84%+/−8% in the re-pressing are standard.

SUMMARY OF THE INVENTION

One object of the invention is to specify a device for obtaining oil from seeds which enables an increased oil yield.

A further object of the invention is to specify a process for obtaining oil from seeds which enables an increased oil yield.

A further object of the invention is to specify a device for obtaining oil from seeds which enables improved energy efficiency.

A further object of the invention is to specify a process for obtaining oil from seeds which enables improved energy efficiency.

The features disclosed hereinafter of a device according to the invention for obtaining oil from seeds are part of the invention both individually and also in all implementable combinations.

A device according to the invention for obtaining oil from seeds has at least one mechanical pressing unit, into which seeds can be supplied, for example also in the form of flakes or already as press cake in the course of the re-pressing.

In one preferred embodiment of the invention, the mechanical pressing unit is designed as a screw press, which has a pressing basket in which a screw is rotatably mounted. The screw is driven here with the aid of a pressing drive.

In one particularly preferred embodiment of the invention, the pressing drive is designed in such a way that the speed is changeable in running operation. If the pressing drive is designed as an electric motor, the speed change of the pressing drive can be carried out, for example, via a frequency converter.

The pressing basket is permeable to the pressed oil, so that the pressed oil exits from the pressing basket over the length of the pressing basket, while the pressed material is conveyed using the screw through the entire pressing basket. At the end of the pressing basket, the mechanical pressing unit has an outlet for the press cake, which essentially consists of the solid components of the pressed material and the remaining oil content.

A device according to the invention for obtaining oil from seeds can have multiple mechanical pressing units, which can be arranged operating in succession or in parallel.

In one embodiment of the invention, a metering device is arranged before the at least one mechanical pressing unit, which is designed as a metering screw, for example, and using which the amount of the pressed material supplied into the associated mechanical pressing unit is controllable.

To regulate the moisture of the supplied pressed material, the device according to the invention for obtaining oil from seeds has at least one conditioner.

With the aid of the at least one conditioner, the pressed material is heatable to a predetermined temperature and moisture can be withdrawn from the pressed material.

In one preferred embodiment of the invention, the at least one conditioner is designed as a pipe bundle conditioning apparatus, as a drum conditioning apparatus, or as a warming pan, using which the pressed material is treatable by the supply of steam, hot water, or condensate.

A drum conditioning apparatus is in this case a substantially horizontally extended cylindrical conditioner having double shell for the indirect heating of the pressed material by saturated steam. Intensive thorough mixing of the pressed material by a stirring mechanism of the drum conditioning apparatus results in a very homogeneous treatment here, wherein the stirring mechanism is suitable for indirect heating using saturated steam. A very good drying effect is implementable by an immediate vapor discharge.

A pipe bundle conditioning apparatus is also a substantially horizontally extended cylindrical conditioner having a centrally arranged steam-heated pipe bundle. The complete drum is rotatable. For a homogeneous treatment of the pressed material, the rotation and the heating pipe bundle is adjustable individually over the entire length of the pipe bundle conditioning apparatus. A very good drying effect is implementable by an immediate vapor discharge.

The moisture and temperature of the pressed material variable with the aid of the conditioner are adaptable in one preferred embodiment of the invention to the specific requirements of various types of pressed material, depending on which pressed material is to be processed.

In one embodiment of the invention, the moisture is variable in a range of approximately 1% to 5% and the temperature can be regulated in a range of 85° C. to 120° C.

In one embodiment of the invention, a moisture of approximately 3% and a temperature of approximately 104° C. are achievable with the aid of the conditioner for a pressed material provided by, for example, rapeseed.

At least one first measuring unit for acquiring the temperature and/or the moisture and/or the fiber content and/or the oil content of the pressed material is arranged in the region of the at least one conditioner.

In one particularly preferred embodiment of the invention, the first measuring unit has at least one NIR (near infrared)-based measuring device, using which light can be emitted in the near infrared (approximately 900 nm to 1700 nm wavelength). Furthermore, the NIR-based measuring device has a receiver unit, using which, on the basis of the absorption of the emitted infrared light by the pressed material, among other things, it is possible to determine the moisture, the oil content, protein content, and/or phosphatide content and the fiber content of the pressed material by a spectroscopic analysis.

In a further preferred embodiment of the invention, the NIR-based measuring device is designed in NIR online technology. NIR online technology in the meaning of this document is the measurement of the wavelength-dependent absorption in the measurement spectrum of the infrared light reflected from the pressed material. The use of the reflected infrared light has the advantage that the NIR-based measuring device only has to be arranged on one side of the process, so that a compact construction is enabled. Measurements are thus also possible in the case of large dumping heights and light-opaque media.

Furthermore, in NIR online technology, the light reflected from the sample is first parallelized, so that no time loss arises during the measurement. In comparison to conventional NIR measuring devices, a sample is measurable with the aid of NIR online technology in approximately 20 ms instead of in 20 seconds to 30 seconds. An NIR-based measuring device in NIR online technology has at least one diode array and a large measuring window opening (in one embodiment having a diameter of approximately 4 cm), so that the measurement takes place over a relatively broad cross section of the sample. Outliers in the measured values, which can otherwise be caused easily by individual seed grains, are thus to be essentially precluded.

In one embodiment of the invention, the NIR-based measuring device can be incorporated into a pipeline at the conveyor unit, which conveys the pressed material into the conditioner or from the conditioner to the mechanical pressing unit, or into a pipeline using a separate sight glass. The immersion depth is approximately 5 mm due to the great proximity of the NIR-based measuring device to the process, so that not only the peel or the outer layer of the pressed material is acquired, but rather also the inner layers, so that accurate analysis is possible.

In one embodiment of the invention, the acquisition of at least the moisture, the fiber content, and the oil content is carried out using another non-NIR-based technology.

In one embodiment of the invention, the first measuring unit has at least one temperature sensor which is designed, for example, as a PT 100 sensor.

In one preferred embodiment of the invention, the first measuring unit has at least one NIR-based measuring device for acquiring the moisture and/or the oil content and/or the protein content and/or the phosphatide content and/or the fiber component and also at least one temperature sensor.

In one particularly preferred variant of the above-mentioned embodiment, the NIR-based measuring device is designed in NIR online technology.

In one embodiment of the invention, the conditioner has at least one steam regulating valve, using which the supply of hot steam to the conditioner can be regulated.

The steam regulating valve is advantageously equipped for this purpose with a positioning drive and is designed, for example, as a rotary plug valve, a globe valve, a butterfly valve, a ball valve, a membrane valve, or as a slide.

In one preferred embodiment of the invention, based on the measured values acquired with the aid of the first measuring unit, the amount of the thermal energy supplied to the pressed material in the conditioner is adaptable precisely to the actual requirements in chronological dependence, so that the supply of more thermal energy than required would be avoided, so that energy can be saved.

In one advantageous embodiment of the invention, in the region of at least one mechanical press of the device for obtaining oil from seeds, at least one supply unit for an extracting agent is arranged, using which an extracting agent is introducible into the pressing chamber of the mechanical press.

In one embodiment of the invention, the supply unit for an extracting agent has a flow rate regulating unit for regulating the amount of the supplied extracting agent.

The flow rate regulating unit is designed in one embodiment of the invention as a regulating valve which can be designed, for example, as a rotary plug valve, a globe valve, a butterfly valve, a ball valve, a membrane valve, or a slide, and has a positioning motor.

In one preferred embodiment of the invention, the supply unit for an extracting agent is designed as a supply unit for carbon dioxide, wherein the amount of the carbon dioxide to be injected into the pressing chamber is controllable via a flow rate regulating unit designed as a gas regulating valve.

In a further embodiment of the invention, the device for obtaining oil from seeds has at least one pressure sensor.

In a further embodiment of the invention, the device for obtaining oil from seeds has at least one mass and/or volume flow meter.

In one advantageous embodiment of the invention, the at least one pressure sensor and/or the at least one mass and/or volume flow meter are usable to regulate the steam supply to the at least one conditioner and/or to regulate the supplied amount of extracting agent.

In one embodiment of the invention, the device for obtaining oil from seeds has a second measuring unit, which is arranged in the conveyance direction after the at least one mechanical pressing unit, so that using this unit at least the oil content of the pressed material can be acquired after the pressing with the aid of the at least one mechanical pressing unit.

In one advantageous embodiment of the invention, the second measuring unit has at least one NIR-based measuring device for this purpose.

In one particularly preferred embodiment of the invention, the second measuring unit has at least one NIR-based measuring device in NIR online technology.

A device according to the invention for obtaining oil from seeds has at least one evaluation and control unit, using which the measurement signals of the first and/or the second measuring unit can be evaluated. Based on the measurement data, the supply of heat to the at least one conditioner is controllable with the aid of the at least one evaluation and control unit, for example, by the actuation of at least one regulating valve, and/or the speed of the pressing drive of the at least one mechanical pressing unit and/or the amount of the extracting agent supplied with the aid of the at least one supply unit for an extracting agent is controllable, for example, by actuating at least one gas regulating valve.

In one preferred embodiment of the invention, the evaluation and control unit is designed to continuously acquire the measured values of the first and/or second measuring unit, so that fast and continuous regulation of the control variables is enabled.

In one advantageous embodiment of a device according to the invention for obtaining oil from seeds, it is designed for initial pressing and re-pressing, wherein an oil yield of approximately 54% to 59% is implemented using the initial pressing and an oil yield of approximately 87%+/−3% is implemented using the re-pressing.

In summary, a device according to the invention for obtaining oil from seeds comprises at least the following embodiment variants:

A one-stage or an at least two-stage variant are comprised, wherein in each stage at least one conditioner and a downstream mechanical pressing unit and at least one conveyor unit for conveying the pressed material from the conditioner to the mechanical pressing unit are arranged.

In addition, one variant is comprised having a moisture regulation of the pressed material in the conditioner and the associated assemblies according to the preceding description.

Furthermore, a variant is comprised having an extracting agent-assisted pressing in at least one stage, wherein in particular CO2 is to be used as the extracting agent.

Moreover, all implementable combinations resulting from these variants are comprised, in particular also a variant having two stages, a moisture regulation of the pressed material in at least one conditioner, and a CO2-assisted pressing in at least one of the stages.

The features disclosed hereinafter of a process according to the invention for obtaining oil from seeds are part of the invention both individually and also and all implementable combinations.

A process according to the invention for obtaining oil from seeds is characterized in particular in that a continuous measurement and evaluation of at least one of the parameters moisture, fiber content, and oil content of the pressed material takes place and that based thereon, at least the conditioning of the temperature and the moisture of the pressed material, at least before the supply of the pressed material into a mechanical pressing unit, takes place continuously on the basis of predetermined target values, or that the speed of the pressing drive is continuously regulated with respect to the fiber content of the pressed material or that the amount of a supplied extracting agent is continuously regulated on the basis of the oil content of the pressed material.

A process according to the invention for obtaining oil from seeds comprises at least the following process steps here:

1. Supplying the pressed material (seeds or press cake from a pressing procedure previously carried out) into at least one conditioner
2. Conditioning the pressed material with the aid of the conditioner
3. Continuously measuring the moisture and/or the fiber content and/or the oil content of the pressed material after the conditioning
4. Continuously evaluating the measurement data with the aid of at least one evaluation and control unit
5. Continuously controlling the conditioning to regulate the moisture of the pressed material to a predetermined target value and/or continuously controlling the speed of the pressing drive and/or continuously controlling the amount of an extracting agent supplied to the pressed material in the pressing chamber of a mechanical pressing unit
6. Conveying the conditioned pressed material to the mechanical pressing unit
7. Pressing the pressed material with the aid of the mechanical pressing device to separate the contained oil from the solid components In one preferred embodiment of the process according to the invention, the continuous measurement of the moisture and/or the fiber content and/or the oil content of the pressed material takes place with the aid of an NIR-based measuring device.

In one particularly preferred embodiment of the process according to the invention, the continuous measurement of the moisture and/or the fiber content and/or the oil content of the pressed material takes place with the aid of an NIR-based measuring device in NIR online technology.

During the conditioning of the pressed material, thermal treatment of the pressed material takes place, which results in spontaneous evaporation of the water in the cell structure of the seed and thus reduces the surface moisture. The conditioning is used here to regulate the pressed material to a predefined moisture and temperature. The optimum moisture in the pressed material creates high efficiency during the subsequent mechanical pressing of the pressed material.

The conditioning takes place in one embodiment of the process according to the invention using heat (steam/hot water/condensate), for example, in a pipe bundle conditioning apparatus, a drum conditioning apparatus, or a warming pan.

The moisture is measured in one embodiment of the invention after the conditioner and the heat to be supplied in the conditioner is regulated based on a comparison of the measured values to predetermined target values.

In two-stage mechanical pressing systems or in a two-stage process according to the invention, the press cake from the initial pressing is conditioned once again, since optimum moisture in the press cake results in high efficiency during the second pressing procedure.

In one embodiment of the invention, the regulation of the moisture of the pressed material is carried out by the controlled supply of hot steam in the conditioner.

In one embodiment of the invention, the mechanical pressing of the pressed material takes place with extracting agent assistance. For this purpose, an extracting agent is injected into the pressing chamber of at least one pressing unit.

In one preferred embodiment of the invention, carbon dioxide is used as an extracting agent.

In one particularly preferred embodiment of the invention, the amount of the extracting agent injected into the pressing chamber can be regulated with the aid of the evaluation and control unit.

The amount of oil measured by the pressing unit in the seed or in the press cake (two-stage process) determines in this case the pressure and/or the amount of supercritical carbon dioxide which is injected as extracting agent into the pressing unit.

By way of the measurement of the oil content before the pressing unit (measured value), the flow rate and/or the pressure of the carbon dioxide to be injected is adjusted in one preferred embodiment of the process according to the invention via a regulating valve.

In one embodiment of the invention, the NIR-based measuring device is used for continuously measuring the moisture of the pressed material, for measuring the fiber content of the pressed material, and for measuring the oil content of the pressed material.

In one embodiment of the process according to the invention, the control of the speed of the pressing drive of the mechanical pressing unit is carried out on the basis of the evaluation of the measured values of the fiber content of the pressed material.

Since the fiber content of the pressed material is variable and the fiber content has an influence on the mechanical pressing of the oil out of the pressed material, in one advantageous embodiment of the invention, a speed change of the pressing drive takes place in the event of changes of the fiber content of the pressed material, in order to achieve high efficiency during the pressing.

In one embodiment of the invention, the fiber content of the pressed material is ascertained here before the pressing unit.

Such a speed regulation is possible both in a one-stage process, and also in a two-stage or multistage process.

The continuous measurement of the fiber content and the moisture of the pressed material and the regulation of the speed and/or the moisture based thereon offers the advantages that new control values for the regulating valves and/or the speed of the press can be set in a short time interval, so that increases of the oil yield of up to 5% can be achieved, and that due to the continuous regulation, in general a strong reduction of the variability takes place, which results in a higher oil yield. Furthermore, the moisture regulation results in optimum use of heat (steam, hot water, condensate), by which energy savings are implementable.

The continuous measurement of the oil content of the pressed material in a process according to the invention offers the advantages in an extraction agent-assisted (in particular carbon dioxide) pressing that new control values for the regulating valves can be set in a short time interval, so that the amount of the supplied extracting agent, in particular the supercritical carbon dioxide, is always in an optimum ratio to the amount of oil, so that an increase of the oil yield, a reduction of the variability of the oil yield, and/or a reduction of the extracting agent consumption are implemented.

Using a process according to the invention for obtaining oil from seeds, an oil yield of 54% to 59% is implementable upon the initial pressing and an oil yield of 87%+/−3% is implementable upon the re-pressing.

Furthermore, the following process parameters are used in embodiments of the process according to the invention:

A typical pressure range of the extracting agent is defined in that the extracting agent is supplied to the pressed material in the pressing unit at a pressure of approximately 100 to 200 bar.

Due to the friction energy generated by the mechanical pressing, a temperature range generally results in such a way that the pressing of the extract after the supply of the extracting agent takes place at a temperature of approximately 40 to 45° C.

With respect to the pressing pressure, it is intended that a mechanical pressing pressure in the range of 250 bar will be generated.

The use of the NIR-based measurement of the moisture and/or the fiber content and/or the oil content, in particular also the NIR online technology, thus enables in comparison to the prior art continuous monitoring of the above-mentioned parameters and rapid adaptation of the process parameters to continuously secure only a small variation range around the predetermined target values. The wet-chemical analysis processes required in the prior art for regularly acquiring the relevant measured variables are only still required for calibrating the NIR system during startup and for recalibration during operation.

BRIEF DESCRIPTION OF THE DRAWING

Exemplary embodiments of the process according to the invention and the device according to the invention are schematically shown in the figures. In the figures.

DETAILED DESCRIPTION OF THE INVENTION

Figure 1:
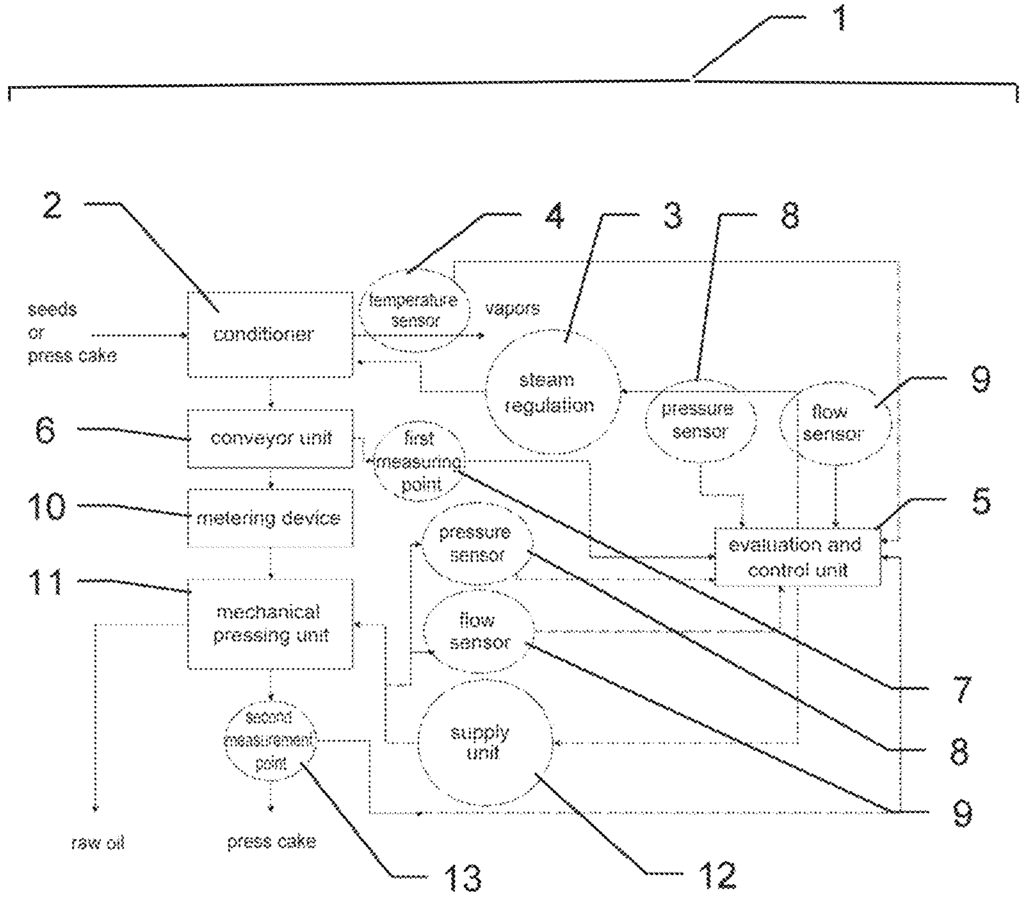
FIG. 1: shows a schematic block diagram of a device according to the invention for obtaining oil from seeds

FIG. 1 shows a schematic block diagram of an embodiment of a device according to the invention for obtaining oil from seeds (1). The device for obtaining oil from seeds (1) has a conditioner (2), using which supplied seeds or press cake can be conditioned with respect to moisture and temperature of the pressed material. For this purpose, the device for obtaining oil from seeds (1) has a steam regulating unit (3), using which a controlled amount of hot steam can be supplied to the conditioner (2). The temperature of the vapors escaping from the conditioner (2) is measurable with the aid of a temperature sensor (4). The measurement data of the temperature sensor (4) are transmittable for evaluation to an evaluation and control unit (5).

A conveyor unit (6) adjoins the conditioner (2), using which the conditioned pressed material can be conveyed toward a mechanical pressing unit (11). A first measuring point (7) is arranged in the region of the conveyor unit (6), which has measuring means for measuring the moisture, the fiber content, and the oil content of the pressed material.

The first measuring point (7) preferably has at least one NIR-based measuring device for this purpose, which is particularly preferably embodied in NIR online technology.

In the illustrated exemplary embodiment of a device according to the invention for obtaining oil from seeds (1), a metering device (10), using which the amount of the pressed material supplied into the mechanical pressing unit (11) can be regulated, is arranged before the mechanical pressing unit (11).

The device for obtaining oil from seeds (1) furthermore has a supply unit (12) for an extracting agent, using which an extracting agent is introducible into the pressing chamber of the mechanical pressing unit (11). A pressure sensor (8) and a flow sensor (9) for measuring the amount of extracting agent introduced into the pressing chamber are arranged in the region of the feedline of the supply unit (12), so that a regulation of the supplied amount of extracting agent is implementable with the aid of the evaluation and control unit (5).

A second measuring point (13), which has measuring means at least for determining the oil content of the press cake exiting from the mechanical pressing unit (11), is arranged in the conveyance direction after the mechanical pressing unit (11).

In one preferred embodiment of the invention, the second measuring point (13) has at least one NIR-based measuring device for this purpose, which is particularly preferably embodied in NIR online technology.

Figure 2:
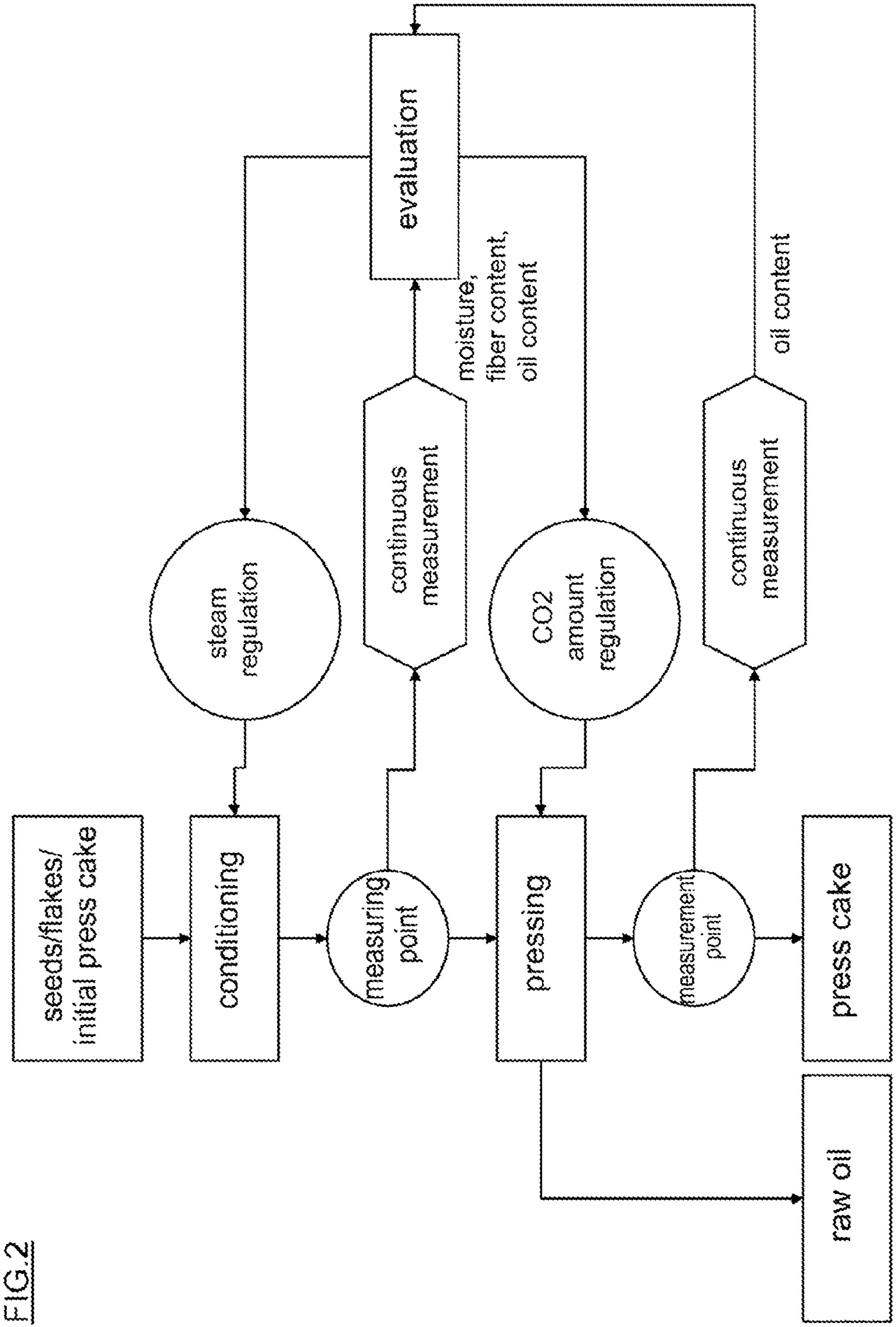
FIG. 2: shows a schematic diagram of a process according to the invention for obtaining oil from seeds.

FIG. 2 shows a schematic view of a flow chart of an exemplary embodiment of a process according to the invention for obtaining oil from seeds.

The seeds are first conditioned with respect to the temperature and the moisture by the supply of hot steam. The conditioned pressed material is conveyed past a first measuring point (7) to a mechanical pressing unit (11). At the first measuring point (7), the moisture, the fiber content, and the oil content of the pressed material are continuously measured with the aid of an NIR-based measuring device, which is based on NIR online technology. The pressed material is pressed using the mechanical pressing unit (11), so that the oil component is separated from the solid components. The raw oil and the press cake exit from the mechanical pressing unit (11). At least the oil content of the press cake is continuously measured in the region of the exiting press cake with the aid of a second measuring point (13), wherein preferably an NIR-based measuring device, particularly preferably according to NIR online technology, is used.

The continuously acquired measured values with respect to the moisture of the pressed material after the conditioning are evaluated and used for the continuous control of the steam regulation, so that moisture and temperature of the pressed material are as close as possible to predetermined target values after the conditioning.

The continuously acquired measured values with respect to the fiber content of the pressed material are evaluated and used for the continuous control of the speed of the pressing drive, so that a speed of the pressing drive adapted to the fiber content of the pressed material is always regulated.

The continuously acquired measured values with respect to the oil content of the pressed material after the conditioning are evaluated and used for the continuous control of the amount of the extracting agent supplied during the pressing, so that an amount of extracting agent adapted to the oil content of the pressed material is always supplied.

The invention claimed is:

1. A process for obtaining oil from seeds, comprising steps of:

supplying a pressed material into at least one conditioner;

conditioning the pressed material with the conditioner;

continuously measuring oil content of the pressed material after the conditioning;

continuously evaluating measurement data with at least one evaluation and control unit;

continuously controlling an amount of an extracting agent supplied to the pressed material in a pressing chamber of a mechanical pressing unit as a function of the measured oil content of the pressed material;

conveying the conditioned pressed material to the mechanical pressing unit; and pressing the pressed material with the mechanical pressing device to separate contained oil from solid components, wherein carbon dioxide is used as the extracting agent.

2. The process for obtaining oil from seeds according to claim 1, wherein the continuous measuring of the oil content of the pressed material includes carrying out at least one NIR-based measurement.

3. The process for obtaining oil from seeds according to claim 2, including using an NIR-based measuring device in NIR online technology to carry out the at least one NIR-based measurement.

4. The process for obtaining oil from seeds according to claim 1, wherein the process is formed in at least two stages, wherein the pressed material is conditioned and initially pressed in a first stage and is conditioned and re-pressed in at least one second stage.

5. The process for obtaining oil from seeds according to claim 1, including using a device for obtaining oil from seeds, comprising: the at least one conditioner for conditioning temperature and moisture of pressed material; at least one mechanical pressing unit; at least one conveyor unit for conveying the conditioned pressed material from the conditioner to the mechanical pressing unit; and a first measuring unit, configured to continuously acquire at least one of parameter from the group consisting of moisture, fiber content, and oil content of the pressed material, arranged in a region of the at least one conditioner.

* * * * *